United States Patent [19]

Aubrey

[11] Patent Number: 4,798,942
[45] Date of Patent: * Jan. 17, 1989

[54] EASY ACCESS TICKET TRANSPORT MECHANISM

[75] Inventor: Kenneth R. Aubrey, San Diego, Calif.

[73] Assignee: Cubic Western Data, San Diego, Calif.

[*] Notice: The portion of the term of this patent subsequent to Aug. 12, 2003 has been disclaimed.

[21] Appl. No.: 831,713

[22] Filed: Feb. 21, 1986

[51] Int. Cl.⁴ .................. G06K 13/063; G06K 13/07
[52] U.S. Cl. .................................. 235/384; 235/483; 235/486; 235/449; 360/2
[58] Field of Search ............... 235/384, 439, 449, 475, 235/477, 476, 480, 482, 483–485, 33, 31 R; 360/2; 271/225–227, 238–240, 248, 257

[56] References Cited
U.S. PATENT DOCUMENTS

| | | | |
|---|---|---|---|
| 3,501,622 | 3/1970 | Weir et al. | 235/384 |
| 3,626,158 | 12/1971 | Lawrence | 235/483 |
| 3,705,396 | 12/1972 | Nagaki et al. | 235/485 |
| 3,777,120 | 12/1973 | Menger et al. | 235/483 |
| 3,997,917 | 12/1976 | Kihara | 360/2 |
| 4,031,359 | 6/1977 | Christou et al. | 235/485 |
| 4,036,430 | 7/1977 | Eppich | 235/482 |
| 4,357,530 | 11/1982 | Roes et al. | 235/384 |
| 4,377,828 | 3/1983 | Hayman et al. | 360/88 |
| 4,605,843 | 8/1986 | Aubrey | 235/486 |

Primary Examiner—Raymond F. Cardillo
Assistant Examiner—Robert A. Weinhardt
Attorney, Agent, or Firm—Brown, Martin, Haller & Meador

[57] ABSTRACT

A fare collection ticket transport mechanism transports tickets along an open longitudinal slot with a portion of the ticket projecting sideways out of the slot so that a patron depositing the ticket in the mechanism can see it while it is being transported and can grasp the projecting portion to release it if it becomes jammed. The portion of the ticket within the slot passes over read, write and verify components of the mechanism. The slot has a side wall or guide projecting out of the slot for guiding the projecting portion of the ticket. The guide has spaced notches to permit a patron to grasp a ticket and vertical ridges or lips at the outer edge of the guide act as stops for the outer edge of the projecting portion of a ticket to prevent the ticket from moving transversely out of the slot.

12 Claims, 3 Drawing Sheets

EASY ACCESS TICKET TRANSPORT MECHANISM

BACKGROUND OF THE INVENTION

The present invention relates to a mechanism for transporting cards or strip-like media such as tickets past various processing stages such as read, write and/or verify heads. The mechanism is particularly directed to a ticket transport mechanism for use in an automatic fare ticket processing system where a patron inserts a ticket into a transport mechanism which moves the ticket past magnetic read or write heads, or similar processors, to verify the ticket or to add or remove fare value from the ticket. In many such systems a ticket can be purchased to the value of multiple rides, with the transport mechanism removing the value of one ride from the ticket, for example. It also has application to credit card processing systems such as automatic teller machines and the like.

In such systems, a ticket or card normally passes into a ticket enclosure or receiving housing in which the ticket is processed. After verification and/or other processing, the ticket or card is returned to the customer. In automatic passenger transit systems, such a housing may be provided on a vehicle such as a bus, tram or train, or may be associated with an entry gate which is opened to permit the patron or passenger to pass through or verification of the ticket. At the system exit, a similar ticket receiving housing will be provided into which the ticket must be inserted to permit opening of an exit gate. If there is a malfunction in the ticket processing equipment, or if the ticket is defective, the ticket could potentially remain in the housing and not be readily recoverable. The passenger then has to contact a supervisor, if one is available, to open up the housing and attempt to recover his ticket. This causes delays, particularly during peak travel times, and can cause significant anxiety to a passenger, particularly where a large stored value ticket is involved and where a supervisor willing to open the housing is not readily available. The necessity for releasing such jammed tickets is time consuming for a transit supervisor who has many other duties.

Similar concerns apply to automatic credit card processing systems in closed housings, where malfunctions could cause a customer to lose the use of a valuable credit card for an extended period of time.

Malfunctions or jamming of the ticket or card transport mechanism in such processing systems can occur because of a fault in the system, defective tickets, loss of power, or for other reasons. Non-return of fare tickets can also occur because of insufficient rides or stored value on the ticket. In any of these cases, the patron may not understand the reason why his ticket is being witheld.

Thus some transit systems have discovered that their patrons feel uncomfortable in placing fare tickets of large value or covering a large number of rides into an enclosed housing with no assurance that the ticket will be returned to them. It is therefore desirable to allow patrons to observe tickets as they are transported through the mechanism, and to allow the patrons themselves to pull the tickets out should they become jammed or trapped. This also adds to the safety of transit station attendants since they do not have to leave their protected booth to clear jammed ticket transports. On buses or other vehicles, the driver will not have to leave his seat to clear jams in the mechanism.

In our U.S. Pat. No. 4,605,843 of the same applicant as this Application and assigned to the same assignee, which issued on Aug. 12, 1986, an easy access ticket transport was described which has an open longitudinal slot along which tickets are passed for fare processing with a portion of each ticket projecting upwardly out of the slot so that the patron can see his ticket at all times and can grab it and remove it if necessary. The transport mechanism moves the ticket along the slot with the portion within the slot passing read, write/encode and verify heads at a predetermined speed to allow effective reading as well as writing and encoding on the ticket. In this ticket transport the ticket passes in a vertical orientation along the slot with a portion projecting upwardly out of the slot.

SUMMARY OF THE INVENTION

According to the present invention a ticket transport mechanism for moving tickets along a predetermined path through the mechanism is provided. The transport mechanism has an open longitudinal slot for guiding tickets along the path so that tickets transported along it project out of the slot. A guide or projecting wall projects out of the slot for guiding the projecting portion of a ticket along at least part of the ticket path, and one or more vertical stops or abutment shoulders are provided on the guide for engaging the outermost edge of the ticket to restrict accidental movement of the ticket transversely out of the slot.

This ticket transport mechanism is therefore orientation insensitive since the tickets are positively restrained from riding out of the ticket path, and the slot may be arranged horizontally or in any other orientation.

The slot has an entry opening at one end for receiving tickets in alignment with the slot, where they are grasped by a ticket moving mechanism to move the tickets along the slot at a predetermined speed. Suitable read, write, and/or verify heads are provided along the ticket path to carry out the desired fare processing operations as a ticket moves along the slot. The ticket projects out to one side of the slot at all times so that the patron can see it. The patron can grasp the projecting portion of the ticket to remove it from the slot if necessary, while the vertical stop prevents the ticket from accidentally riding out of the slot.

The projecting portion preferably comprises a lower wall projecting out of the side opening of the slot with a vertical projection or abutment at the outer edge of the wall comprising the stop for retaining a ticket in the slot. The wall preferably has one or more recessed openings for allowing a patron to insert their fingers to grip a ticket at that opening. The length of each opening is less than the length of a ticket, so that the ticket is at all times retained in the slot by the engagement of at least part of the outer edge of the ticket behind portions of the stop between successive openings. If a patron should need to remove the ticket from the slot, the ticket is simply gripped and lifted upwardly to clear the stop and then pulled outwardly out of the slot.

Preferably, the entry opening is an enclosed opening to align the ticket horizontally and longitudinally with the open end of the slot. An exit opening, which need not necessarily be enclosed, is preferably provided at the opposite end of the slot, where the patron can remove a processed ticket. The sideways opening of the slot along its length through which the projecting portion of a ticket projects is preferably provided with a protection device to prevent sideways entry of a ticket into the slot while permitting longitudinal movement of the ticket in the slot. The protection device can also protect against entry of foreign objects into the slot which could damage the read and write heads.

The transport mechanism moves a ticket inserted through the entry opening along the ticket path past the read, write/encode and verify heads at the predetermined speed to allow effective reading, writing and encoding of data along a magnetic strip on the ticket. The heads may be positioned to read data from a magnetic strip extending along a central area of the ticket or along a strip towards one edge of the ticket. At the end of its movement, the ticket is stationary at the exit end of the slot and can be removed by the patron. If any jamming or malfunction should occur during ticket processing, the patron can remove the ticket by gripping the portion projecting sideways out of the slot and try again. If the ticket is processed successfully, the ticket is returned to the patron at the exit end of the slot. The mechanism may be provided at the entrance of a vehicle such as a bus, or associated with a gate for a passenger to pass through to enter or exit the transit system. The gate is opened if the ticket is verified successfully. If there is no remaining value on the ticket, a mechanism may be provided for capturing the ticket in the slot. A reverse mechanism may be provided in the transport mechanism which is arranged to be activated in the event that a ticket is entered incorrectly, for example if the magnetic strip on the ticket carrying stored fare information is not positioned in alignment with the read and write heads. The reverse mechanism runs the ticket moving mechanism in reverse so that the ticket is returned to the patron through the entry opening.

Thus the ticket transport mechanism of this invention allows a patron to remove his own ticket from the slot if there is any failure in the system, loss of power to the system or jamming of the ticket moving mechanism. This has the advantage of encouraging ticket carrying patrons to use the system correctly without worrying about the risk of losing a possibly high value ticket, and also removes the requirement of having a supervisor available at all times to constantly tend the various ticket transport mechanisms to clear jammed tickets.

BRIEF DESCRIPTION OF THE DRAWINGS

The present invention will be better understood from the following detailed description of a preferred embodiment of the invention, taken in conjunction with the accompanying drawings, in which like reference numerals refer to like parts and in which.

DESCRIPTION OF THE PREFERRED EMBODIMENT

The drawings show a preferred embodiment of a ticket transport mechanism according to the present invention which is arranged to transport tickets in a horizontal orientation along a ticket processing path with a portion of each transported ticket being visible and accessible at all times to a patron during processing.

Figure 1:
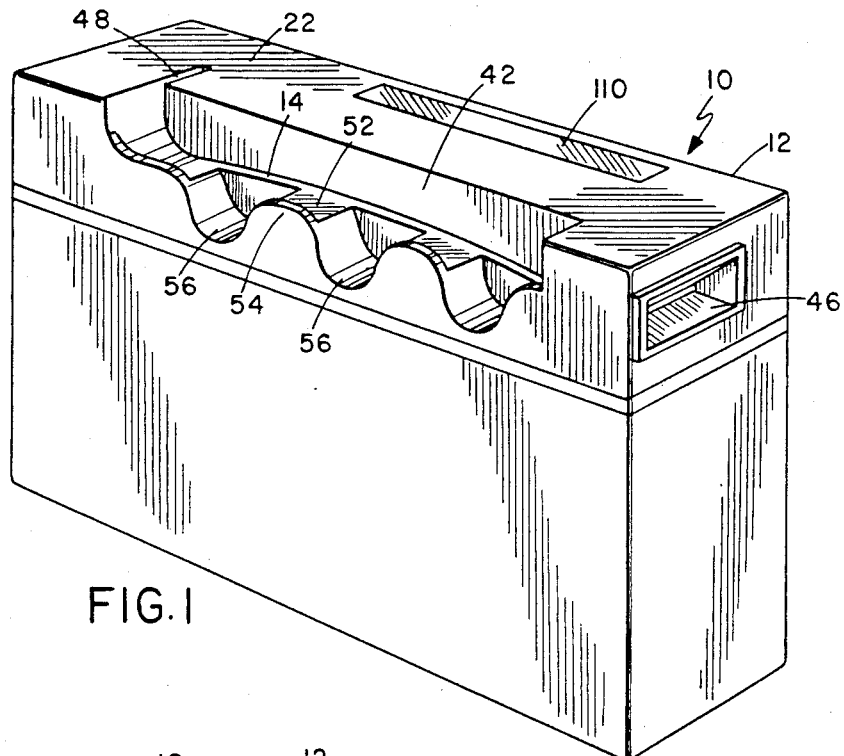
FIG. 1 is a perspective view of the ticket transport unit.

As shown in FIG. 1, the transport mechanism 10 comprises an enclosure or housing 12 having a sideways opening longitudinal slot 14 through which a fare ticket 16 is transported by a ticket moving mechanism 18 housed within the enclosure 12.

Figure 2:
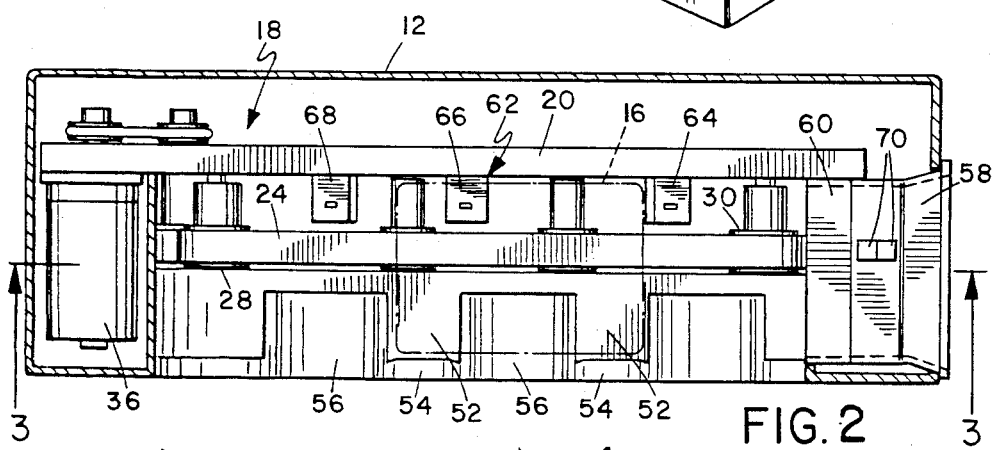
FIG. 2 is a top plan view with the top panel or wall cut away.
Figure 3:
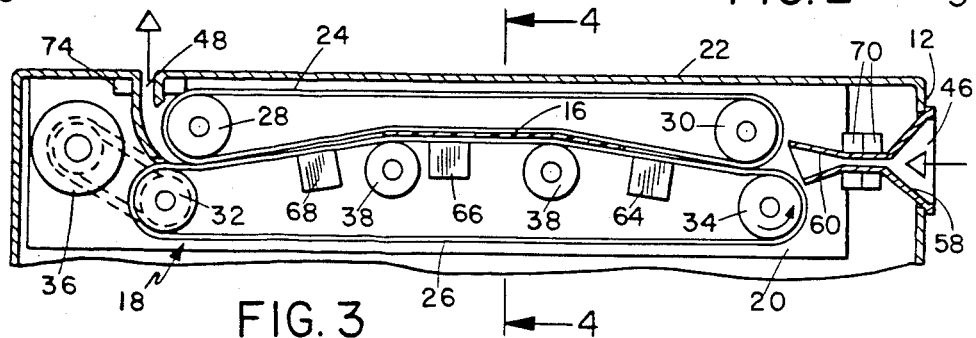
FIG. 3 is a sectional view taken on the line 3—3 of FIG. 2.

The moving mechanism 18 is preferably of the type described in application Ser. No. 696,644 of Williams et al, assigned to the same assignee as the present application, which was filed on Jan. 30, 1985 and entitled "Ticket Transport Mechanism", now abandoned. As shown in the drawings, the slot defining the ticket path is arcuate in an upwards direction. The arch is arranged to accommodate the arched path of the stretched belt ticket moving mechanism 18, which is best shown in FIGS. 2 and 3. Although an arched ticket path is shown in the preferred embodiment of the invention, the ticket path may be straight in alternative embodiments employing straight line types of ticket moving mechanisms.

The ticket moving mechanism is mounted on a supporting wall 20 within the housing which depends downwardly from the upper wall 22 of the housing and defines the inner wall of the slot 14. The mechanism basically comprises upper and lower opposed, continuous stretched elastic belts 24, 26 which are stretched around rollers 28, 30 and 32, 34, respectively, at opposite ends of the ticket path. The belts are driven by motor 36 which rotates drive roller 32 to drive belt 26 directly and belt 24 indirectly by frictional engagement with belt 26. Guide rollers 38 along the ticket path urge the belts 24 and 26 upwardly, as shown in FIG. 3, to define the slightly arched ticket path, so that the belts are stretched and elastically biassed against one another to positively grip a portion of a ticket 16 between them and transport the ticket along the ticket path.

Figure 4:
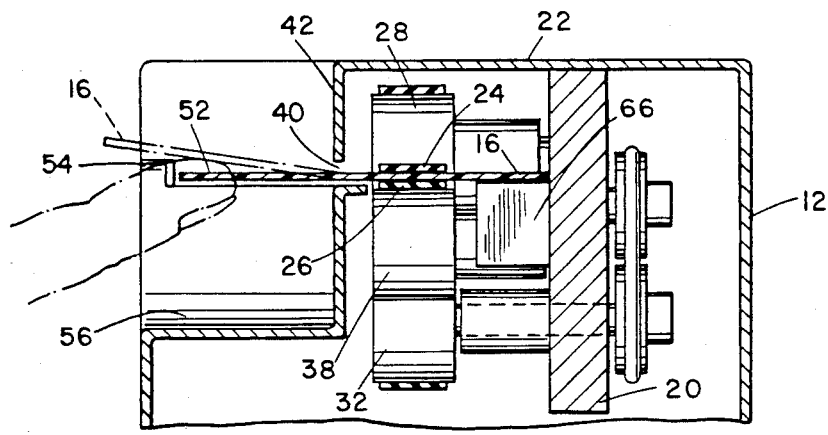
FIG. 4 is an enlarged sectional view taken on the line 4—4 of FIG. 3.
Figure 5:
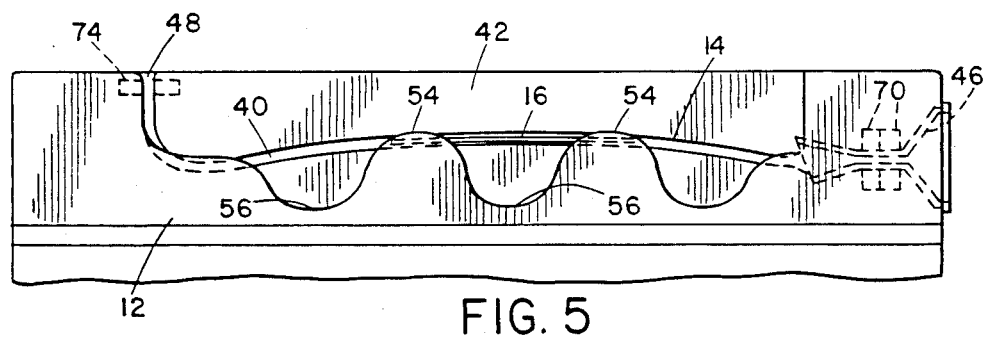
FIG. 5 is a side elevation view of the unit showing the ticket path.

The slot 14 is dimensioned such that a side portion of a ticket moved along the ticket path will project out of the slot, as shown in FIG. 4. The slot is defined by the inner supporting wall 20, the upper and lower belts of the transport mechanism, and an opening 40 extending along a recessed side wall 42 of the housing 12 through which a side portion 44 of a ticket carried along the slot will project. The opening 40 is best shown in FIG. 5 and extends between a first end which communicates with an entry opening 46 in one end wall of the housing and curves upwardly at its opposite end to communicate with an exit opening 48 in the upper wall 22 of the housing.

The slot has a lower wall or guide 52 which is formed by the step in the side wall 42 defining the recess. The lower wall 52 projects outwardly from the opening 40 to support the projecting portion 44 of a ticket transported along the slot. The projecting lower wall 52 of the slot is curved upwardly at its center portion to follow the arched shape of the ticket path, and curves upwardly at the exit end as shown in FIG. 5 to guide tickets through the exit opening 48.

The lower wall 52 has a raised shoulder, stop or lip 54 at its outer edge, as best shown in FIGS. 1 and 4, which engages the outer edge of the ticket to prevent it from accidentally riding out of the slot during transportation. A series of recessed finger openings or notches 56 are provided in the lower wall to permit a person to grasp the projecting portion of a ticket in the slot and pull it out. Each opening or notch 56 is of length less than the length of a ticket, so that a ticket travelling along the slot will at all times be retained in the slot by engagement of at least part of the ticket behind portions of the guide 54 adjacent the notch 56 (see FIG. 2). Although the slot is shown in the drawings as transporting tickets in a horizontal orientation, the arrangement could be used to transport tickets in any convenient orientation, including facing downwards, since they are positively prevented from riding out of the slot by the guide 54.

The slot entry opening 46 is arranged to receive tickets in horizontal and longitudinal alignment with the slot. As shown in FIGS. 1 and 3, the entry opening 46 comprises a horizontal recessed slot in the end wall of the housing 12, which has bezel surfaces 58 for guiding or forcing the ticket into an aligned position to pass through the entry opening. The ticket is then guided between upper and lower guide surfaces 60 defining the entry opening into the slot and between the opposed elastic belts of the transport mechanism. Thus the ticket is moved through the entry opening where it is partly hidden from view and into the recessed portion of the side wall where the side portion 44 projects out of the slot 14 where it is visible at all times to the patron.

Figure 7:
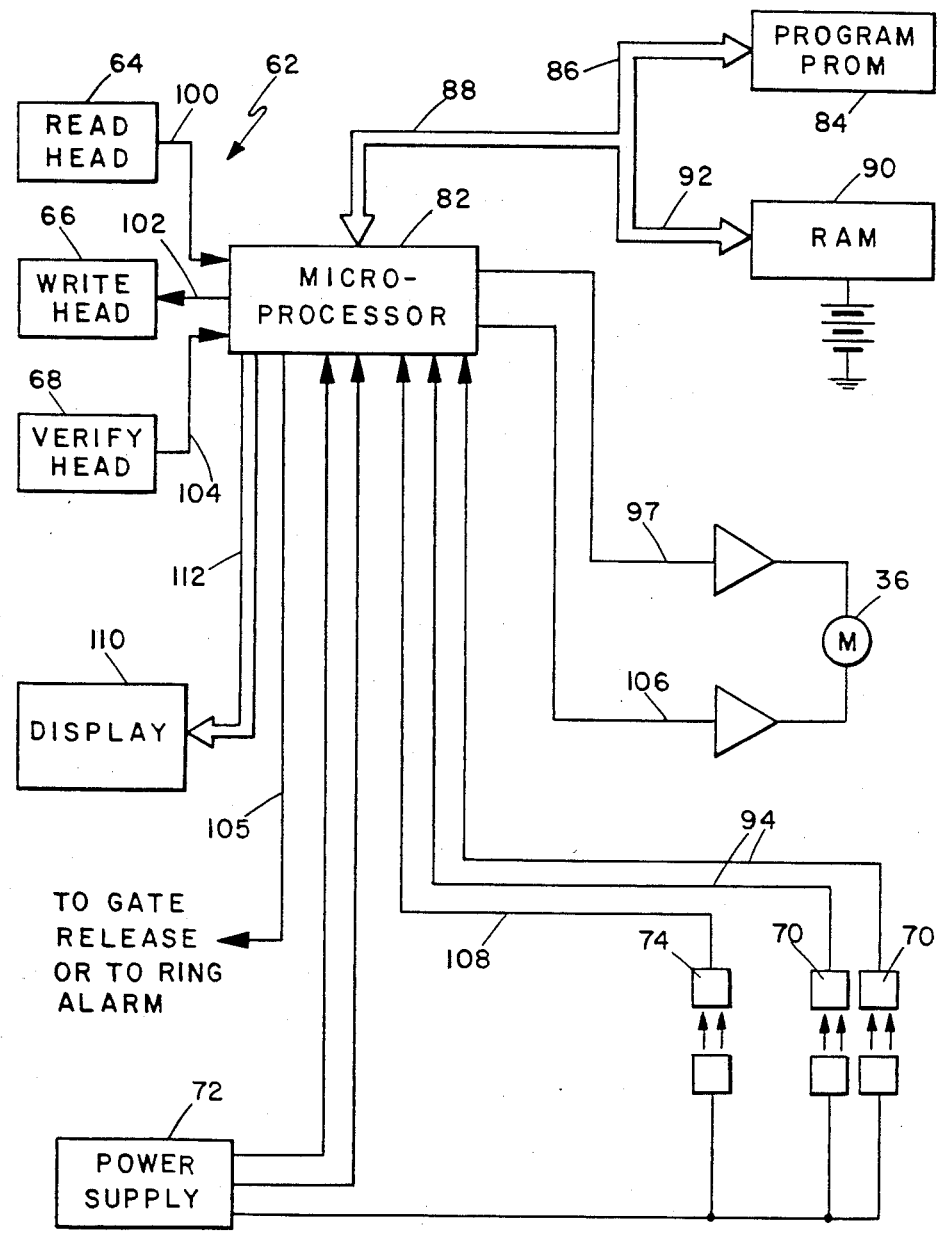
FIG. 7 is a block diagram of the control and actuating system for the transport unit.

A ticket processing system 62 for processing information encoded on a magnetic stripe on the ticket 16 on a ticket is provided within the housing 12 along the ticket path. As shown in FIGS. 2, 3 and 7, the processing system includes a read head 64, a write/encode head 66, and a verify head 68 mounted on the supporting wall at spaced positions along the ticket path. The various processing heads may be in a different order to that shown in the drawings, and a greater or lesser number of heads may be provided in alternative embodiments. The various heads are positioned to process information on a band or stripe located on the lower face of a ticket moving along the path.

Figure 6:
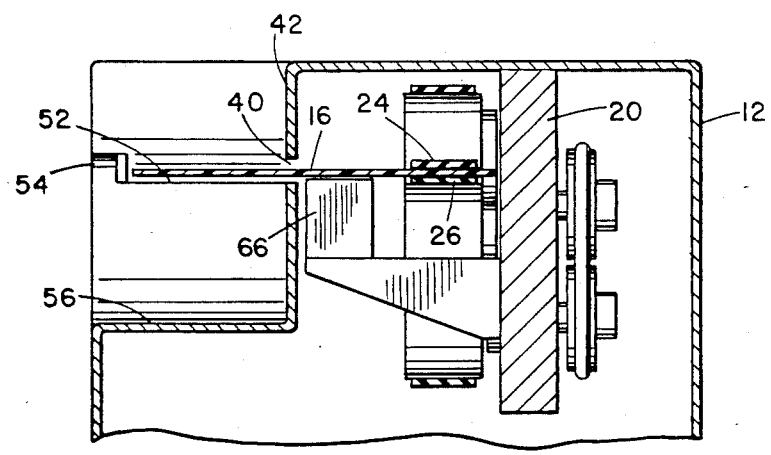
FIG. 6 is a sectional view similar to FIG. 4, but with the transport mechanism arranged for tickets having the magnetic data stripe at the center.

In the preferred embodiment of the invention the ticket has a magnetic band on which fare, identification and other information can be stored and encoded as is well known in the field. Thus the heads 64, 66 and 68 are designed to read, write and record magnetic information on the ticket. However, it will be understood that any data reading, writing and recording systems may be used for processing the ticket information, for example optical or inductive systems, in alternative embodiments. Spring rollers (not shown) may be provided to act on the upper face of the ticket opposite the magnetic strip to urge the ticket into contact with the respective heads and to ensure that the magnetic strip is positioned correctly relative to the heads. The magnetic read, write and verify heads may be positioned to process information from a magnetic strip extending along adjacent one side edge of the ticket as shown in FIG. 4, or from a magnetic strip extending along the center of the ticket as shown in FIG. 6, with suitable positioning of the belts forming the transport mechanism to one side of the processing heads.

The moving mechanism 18 is designed to grasp a ticket inserted through entry opening 46 and to move it at a predetermined speed along the slot 14 to the exit opening 48. The speed of the ticket is chosen to allow effective reading, writing and encoding of data along the magnetic strip.

The control or processing system 62 for operating the ticket transport mechanism is shown in block diagram in FIG. 7. Ticket entry sensors 70, which may be optical, magnetic or inductive, are provided adjacent entry opening 46 as shown in FIGS. 2 and 3 to sense the entry of a ticket and to activate a power supply 72 to operate the motor 36 of ticket moving mechanism 18. The moving mechanism then grasps the forward end of the ticket and pulls it into the slot for transport along the ticket path. A further sensor 74, preferably of the same type as the entry sensors, is provided adjacent the exit opening 48 of the ticket path as shown in FIGS. 3 and 5 to sense when a ticket arrives at the exit opening and to turn off the motor at this point. The control system for controlling and actuating the moving mechanism and processing mechanism, and for providing operational control of other components from the information read from the magnetic strip of a ticket or received from a ticket sensor, is mounted within the housing 12. The system is shown schematically in FIG. 7 and comprises a microprocessor 82 which is suitably programmed by a program PROM 84 via bus lines 86 and 88. Random access memory (RAM) 90 stores information read from tickets for further processing. Memory 90 is accessed by the microprocessor through bus 92 and 88. The various other components of the system are linked to the microprocessor as indicated in FIG. 7 to receive control signals from the microprocessor and to communicate data to the microprocessor.

In operation, a passenger or patron of a transit system of which the transport mechanism 10 forms part will enter their ticket via entry opening 46. The transport mechanism may be associated with an entry or the exit gate of the system, or be provided at the entrance to a transit vehicle such as a bus. The ticket must be in the correct horizontal and longitudinal alignment with the entry opening to be permitted to enter the slot, and should be inserted with its magnetic or encoded data strip facing downwards.

As the ticket is inserted through the slot, entry sensors will detect the ticket and communicate a ticket detection signal via lines 94 to the microprocessor, which activates the power supply 72 and controls the motor along line 97 to drive in forward. This drives the roller 32 to rotate the endless belt 26, and thus to rotate the belt 24, which will positively grasp and pull the ticket between the upper and lower rollers 30 and 34 at the entry end of the slot and transport it along the slot 14 with a portion projecting out to one side of the slot. As the ticket passes the read, write and verify heads 64, 66 and 68, appropriate information is either read from or encoded on the ticket via lines 100, 102 and 104 communicating the respective heads with the microprocessor.

Should the sensors 70 sense that something other than the appropriate fare ticket is entered via opening 46, then the motor will not be energized and the belts will not move to pick up whatever has been entered. If the ticket is entered incorrectly, for example with the magnetic strip facing upwards rather than downwards or in the incorrect position, the read head 64 will be unable to read any information. This situation will cause the microprocessor 82 to energize the motor via line 106 to drive in the reverse direction, rotating the belts in the opposite direction to move the ticket back out of the opening 46 to return it to the passenger. The passenger can then re-enter the ticket in the correct orientation.

If either the read or verify head 64 or 68 is unable to read or verify appropriate information from the magnetic strip on the ticket, the microprocessor will again energize the motor to drive in reverse and return the ticket to the entry opening.

Assuming that the read head reads the appropriate information from the ticket and finds that there is a sufficient number of stored rides or a sufficient amount of stored value on the ticket for the particular ride for which the ticket is being processed, the information is passed to the microprocessor which sends an appropriate signal along line 105 to the driver of a vehicle on which the mechanism is provided, for example, or to release a gate to permit the passenger to enter or exit the transit system. After all the pertinent information is read from the ticket, the information is stored in RAM 90 and the program provides appropriate instructions to the microprocessor to instruct the write head 66 to write the appropriate information on the fare ticket, i.e. deducting the appropriate ride or value from the stored information on the ticket. The verify head 68 reads this information to ensure that it is correct before the ticket is passed to the exit opening 48.

When the exit sensor detects that a ticket has arrived at the exit opening, a suitable signal is transmitted along line 108 to the microprocessor which de-activates the motor to stop the belts and allow the ticket to be pulled out via the exit opening.

During ticket transport and processing appropriate information will be provided by the microprocessor for display to the patron in a display window 110 provided on the upper wall of the housing.

At all times during ticket processing the passenger can observe the projecting portion 44 of the ticket and will immediately see if the ticket stops or becomes jammed. He will then be able to remove the ticket by gripping the projecting portion of the ticket via the appropriate access notch 56, as indicated in FIG. 4, lifting it slightly to clear the raised guide or shoulder 54, and pulling it out of the slot. The belts of the moving mechanism are designed to grip the ticket sufficiently to move it along the ticket path but at the same time to release it if sufficient force is applied in a sideways direction by a passenger wishing to remove the ticket from the slot. If the passenger does not bother to remove a jammed ticket but leaves it in the slot obstructing the ticket path, the next passenger at that gate or entering a vehicle will see the problem and can remove the obstructing ticket before entering his own. Thus gates at transit system entries and exits, or ticket processors on transit vehicles will not remain out of operation for prolonged periods of time and a supervisor is not needed to release jammed tickets.

If a passenger should remove a ticket during transportation along the ticket path, the microprocessor after a predetermined time lapse with no signal from exit sensor 72 will deactivate the system. The gate release will not be operated and an alarm may be rung via a control signal along line 105. An alarm may also be rung if a problem regarding the fare ticket is detected by the sensors or the read or verify heads.

During operation of the ticket transport mechanism appropriate information will be displayed to the passenger on display window 110 according to display control signals received by display from the microprocessor along line 112. Thus the passenger will be able to see fare information read from or encoded on the ticket, for example, and will see an INVALID or FARE INSUFFICIENT signal where the heads were unable to read information from the ticket or where there is insufficient value remaining on the ticket for the desired ride.

Preferably, as in U.S. Pat. No. 4,605,843 a protective barrier device is provided to prevent sideways entry of a ticket or other foreign body through the side opening in the slot. The barrier device can take any of the forms shown and described in application Ser. No. 724,652 now U.S. Pat. No. 4,605,843 and will therefore not be described in any more detail here.

The ticket transportation mechanism described above is suitable for use in conjunction with exit or entry barriers such as gates in a transit system to permit passengers to exit or enter a transit area or station for transit vehicles such as buses, subway cars, trains or the like. It can also be used in conjunction with the ticket processing systems provided on such transit vehicles. It enables the fare ticket to be processed to check information on fare value and other pertinent information for use in a fare collection system, and to deduct the appropriate value for a given ride from the ticket, while the ticket is at all times visible to its owner who therefore does not have to be anxious about the possibility of losing a valuable ticket. This reduces the risk of patrons attempting to by-pass the ticket processing system, for example by entering a closed gate, or other potentially fraudulent or damaging activity. This also reduces the necessity for having on the spot supervisors or transit vehicle drivers release jammed tickets from the ticket processing mechanisms, since jammed tickets can be seen by the passengers themselves and pulled out relatively easily.

Thus the ticket transport mechanism is easily accessible by the passenger to reclaim his ticket if necessary and at the same time will prevent tickets transported along the path from accidentally slipping sideways out of the slot, since the outer edge of the projecting portion of the ticket will be guided against vertical shoulder 54 as it travels along the ticket path.

Although the transport mechanism is described above for use in transit systems in ticket processing, it may be used to transport any strip like media such as credit cards along a processing path.

Although a preferred embodiment of the invention has been described above by way of example, it will be understood by those skilled in the field that modifications may be made to the disclosed embodiment without departing from the scope of the invention, which is defined by the appended claims.

What is claimed is:

1. A ticket transport mechanism for receiving and processing tickets from a patron, comprising:

ticket transport means for moving tickets at a predetermined speed along a ticket path through the mechanism;

the transport means having an open longitudinal slot comprising means for guiding a ticket along the ticket path with a portion of the ticket projecting out of the slot, the slot having an entry opening at one end for receiving tickets and further including ticket moving means for grasping a ticket at the entry opening and moving the ticket along the slot;

stop means for engaging an outer edge of the projecting portion of a ticket in the slot to restrict movement of the ticket transversely out of the slot; and processing means for processing information from a ticket travelling along the slot.

2. The mechanism as claimed in claim 1, further including guide means projecting from the slot opening for guiding the projecting portion of a ticket in the slot, the stop means comprising transverse shoulder means on said guide means for engaging an outer side edge of the projecting portion of a ticket.

3. The mechanism as claimed in claim 2, wherein said guide means comprises a wall projecting away from said slot for engaging one side face of the projecting portion of a ticket in said slot, the wall having an outer edge remote from said slot, and said stop means comprising a shoulder projecting from the outer edge of said wall.

4. The mechanism as claimed in claim 2, wherein said guide means has at least one recessed notch along its length for receiving the fingers of a patron for grasping and pulling a ticket over said shoulder and out of said slot.

5. The mechanism as claimed in claim 4, wherein said guide means has a plurality of recessed notches, the length of each notch being less than the length of a ticket.

6. The mechanism as claimed in claim 1, wherein said slot is arcuate.

7. The mechanism as claimed in claim 1, including sensor means for sensing the entry of a ticket into said ticket path and control means operated by said sensor means to control operation of said moving means.

8. The mechanism as claimed in claim 7, wherein said control means includes means for driving said moving means in reverse in response to incorrect entry of a ticket in said slot.

9. A fare collection ticket transport mechanism for receiving and processing fare tickets from a patron, comprising:
   means defining a ticket path for tickets through the mechanism having an open longitudinal slot for guiding tickets along the ticket path with a portion of each ticket in the slot projecting out of the slot;
   the slot having an entry opening at one end for receiving tickets in alignment with the slot;
   ticket moving means for moving tickets along the slot at a predetermined speed;
   means for reading information from fare tickets as they move along the slot;
   write means for encoding information on fare tickets as they move along the slot; and
   guide means projecting from the slot for guiding the projecting portions of tickets moving along the slot, the guide means including stop means for engaging an outer edge of the projecting portion of each ticket in the slot to restrict transverse movement of tickets out of the slot.

10. A ticket transport mechanism for receiving and processing tickets from a patron, comprising:
    a housing having an opening extending along one side wall defining a ticket path along which tickets pass through the housing;
    means within the housing defining a slot for guiding tickets along the ticket path in a horizontal orientation with a side portion of a ticket in the ticket path projecting out of the opening in the side wall of the housing;
    the housing having an entry opening at one end for insertion of tickets into the slot and an exit opening at the other end of the slot for exit of tickets from the ticket path;
    ticket transport means within the housing for transporting tickets along the slot between the entry opening and the exit opening with a side portion of the ticket projecting out of the slot opening; and
    ticket processing means within the housing for processing information on tickets transported along the slot.

11. The mechanism as claimed in claim 10, wherein the side wall of the housing having the slot opening is stepped to define a recess, the opening being provided in the vertical wall of the recess and the step defining the recess comprising a guide for supporting the projecting portions of tickets transported along the slot.

12. The mechanism as claimed in claim 10, wherein the transport means comprises means for transporting tickets along a slightly arched ticket path, the slot opening being arched upwardly to follow the arched ticket path defined by the transport means.

* * * * *